Patented Nov. 9, 1943

2,334,108

UNITED STATES PATENT OFFICE 2,334,108

CATALYTIC ALKYLATION PROCESS

Sumner H. McAllister, Lafayette, John Anderson, Berkeley, and Edwin F. Bullard, Oakland, Calif., assignors to Shell Development Company, San Francisco, Calif., a corporation of Delaware No Drawing. Application June 30, 1941, Serial No. 400,560

10 Claims. (Cl. 260—683.4)

This invention relates to the alkylation of organic compounds by reaction with alkylating agents in the presence of inorganic acid alkylation catalysts. It deals particularly with the use of new and more advantageous catalyst mixtures in such reactions.

Although the invention is not limited thereto, it will be described with more particular reference to the alkylation of isoparaffins by reaction with olefines in the presence of concentrated sulfuric acid since this reaction is of special commercial importance and is carried out on a very large scale. Because the acid gradually loses its catalytic effectiveness in the process, large amounts are required and in many cases disposal of the spent acid is a problem. It is an object of the present invention to reduce the consumption of catalyst acid in alkylation processes of this type. A further object of the invention is to increase the yield and quality of alkylation products obtainable from feed stocks containing isoparaffins and olefines in approximately equal molecular proportions. Still other objects and advantages of the invention will be apparent from the following description.

Various expedients, including the addition of a variety of different agents to the catalyst, have been suggested for increasing the effective life of the acid used in the alkylation of isoparaffins. Thus, for example, the addition of copper, silver, zinc, cadmium, barium and mercury salts or of oxides of phosphorus and the like to sulfuric acid alkylation catalysts has been proposed. However, none of these proposed additions has proved to be entirely satisfactory.

It has now been found that better results may be obtained by carrying out the alkylation of isoparaffins with acid alkylation catalysts in the presence of a metal of the first transition series having an atomic number of at least 24 and more preferably of at least 27. It is usually preferable to add the metal to the catalyst in the form of a suitable salt but other methods of incorporating the chosen transition series metal may be used. While only relatively small amounts of these transition series metals are necessary, it is generally preferable to use a catalyst solution containing a higher concentration of the chosen metal than that which would be obtained by carrying out the usual low temperature alkylation in a reactor lined with such a transition metal. However, in some cases, improved results may be obtained with catalyst solutions containing such lower concentrations of a metal of the first transition series having an atomic number of at least 24. As a rule, it is preferred when using concentrated sulfuric acid to use at least about 0.1% of sulfate of the chosen transition series metal. With other acids which are used at higher alkylation temperatures it may be desirable to use higher concentrations of the chosen metal salt which may be the sulfate or may be a salt of the acid employed. In general, amounts between about 0.05% and 0.5% are most advantageous.

The process may advantageously be carried out by the methods described, for example, in United States Patents 2,211,747 and 2,232,674, but other methods of batch, intermittent or continuous operation may also be used. A wide variety of different tertiary aliphatic carbon atom-containing compounds may be alkylated by the process. Thus, for example, isobutane, isopentane, isohexane, 2,2,5-trimethyl hexane, methyl cyclopentane, methyl cyclohexane, paradimethyl cyclohexane and the like may be alkylated either singly or in admixture with or without other compounds which may be inert under the reaction conditions or which may undergo simultaneous alkylation or other reaction which does not interfere with the process. The invention is not limited to the alkylation of open and closed chain paraffins having a tertiary carbon atom and suitable substitution products thereof but may also be applied to the alkylation of aromatic compounds such as benzene, toluene, naphthalene, phenols, and the like.

The invention is particularly applicable to alkylations in which olefines are used as the alkylating agent. Typical of the olefines which may thus be used are, for example, ethylene, propylene, alpha and beta butylenes, isobutylene, the amylenes, cyclopentene, cyclohexene, methyl cyclohexene and higher olefines or mixtures thereof such as fractions of cracking gases or of cracked or reformed gasoline and the like. Instead of the olefines themselves, polymers thereof as, for example, diisobutylene or interpolymers of tertiary olefines with other less reactive olefines such as are described in United States Patent 2,174,247, or esters, either organic or inorganic, corresponding to such olefines or polymers may be used. Inorganic or organic esters of primary alcohols such as methyl, ethyl, propyl, butyl, isobutyl and like alcohols may be employed as alkylating agents instead of the secondary and tertiary esters corresponding to the olefines. The process is also advantageous when ethers or alcohols are used as the alkylating agent. It may likewise be used when aralkylating agents such as, for example, benzyl alcohol, cinnamyl alcohol, and the like or substituted alkylating agents are employed, and the expression "alkylating agent" will therefore be understood as referring generically to any compound capable of substituting an alkyl group, which may or may not contain one or more substituent elements or groups, for a hydrogen atom attached to a tertiary aliphatic carbon atom.

A wide variety of different acid alkylation catalysts may be used in the process. Thus, in place of sulfuric acid, halo-sulfonic acids, particularly fluoro- and chloro-sulfonic acids, phosphoric acid and the like, or mixture of such acids or mixtures of one or more such acids with boron fluoride and/or hydrogen halide or the like, may be used. In the new catalyst mixtures of the invention these acids are preferably used in combination with the corresponding salts of metals of the first transition series having an atomic number of at least 24. Thus, for example, sulfates of such metals are preferably used with sulfuric acid or acid mixtures containing large amounts of sulfuric acid while the phosphates may be advantageously used when phosphoric acid or mixtures of phosphoric acid and hydrogen fluoride or the like are employed. It is also feasible to use sulfates such as chromium, manganese and/or cobalt sulfates with phosphoric acid. When salts of acids which are weaker than the alkylation catalyst acid are added to the catalyst they will be converted to salts of the catalyst acid; thus, the effective agent will be cobalt sulfate when cobalt nitrate or acetate, for example, is added to sulfuric acid catalyst.

The new alkylation catalyst mixtures are preferably used in the liquid state and may be deposited or distributed on suitable porous or non-porous supports or may be used without supports advantageously in the form of emulsions with the reactants. They may also be used, particularly in case phosphoric acid or the like is employed, in solid form. As a rule, alkylation of isoparaffins with mixtures of acid alkylation catalysts and salts of metals of the first transition series having an atomic number greater than 23 may be carried out under the same reaction conditions found suitable with the corresponding acid catalysts alone. Thus, for example, in alkylating isobutane or isopentane with olefines such as propylene, the butylenes or the amylenes, temperatures between about 0° C. and 50° C. may be used with mixtures of sulfuric acid of about 90% to 110% concentration (on a hydrocarbon-free basis) and sulfates of chromium, manganese, cobalt and the like, while lower temperatures of the order of about −60° C. to about 20° C. are preferable with similar mixtures in which chlorsulfonic acid is used in place of sulfuric acid. The preferred range of temperatures for phosphoric acid-cobalt phosphate mixtures is between about 300° C. and 400° C., although higher or lower temperatures may be used. For the alkylation of benzene with ethylene, for example, temperatures of the order of about 300° C. are advantageous when phosphoric acid-cobalt phosphate mixtures are used as catalyst, while lower temperatures, for example, about 10° C. to 50° C. are preferred when catalytic mixtures of sulfuric acid and cobalt sulfate are employed.

The process may be carried out with the reactants in the gaseous state but it is preferable, particularly when using sulfuric acid alkylation catalysts, to use conditions at which at least the isoparaffin being alkylated is in the liquid phase; and, most preferably, reaction conditions which insure the presence of all reactants at least partially in the liquid phase are employed. To the latter end it is usually advantageous to operate under superatmospheric pressure when using low boiling reactants. In liquid phase operations with liquid catalyst mixtures it is generally desirable to employ a volume of catalyst phase at least equal to about 40%, and more preferably about 60% to about 150%, of the volume of hydrocarbon phase used. Whatever the method of carrying out the reaction, it is advantageous to use a substantial excess of isoparaffin or the like when using olefinic alkylating agents. With mixtures of sulfuric acid and sulfates of metals of the first transition series having atomic numbers of at least 24, isoparaffin to olefine molar ratios of at least 3 to 1 are desirable and best results are obtained by effecting the alkylation under condition such that ratios of 20 to 50 or more mols of isoparaffin are present per mol of olefine in the reaction mixture. Similar or higher ratios are advantageous when using alkyl sulfates or phosphates as alkylating agents but lower ratios may be used when alkyl halides are used as the alkylating agent.

The following example illustrates one suitable method of applying the principles of the invention and shows its advantages, particularly in increasing the amount of high quality alkylate obtainable from a given amount of catalyst acid.

Isobutane was alkylated by reaction with propylene in the presence of sulfuric acid, first using sulfuric acid alone and then using a mixture of sulfuric acid and 1% of cobalt sulfate heptahydrate under the same conditions. The hydrocarbon feed had the following composition:

| | Per cent by weight |
|---|---|
| Ethane | 0.9 |
| Propane | 2.4 |
| Propylene | 10.4 |
| Isobutane | 78.4 |
| Normal butane | 7.9 |

This feed containing 5.5 mols of isobutane per mol of olefine was pumped continuously into a circulating emulsion of catalyst and hydrocarbons in which 0.7 volume of acid were present per volume of hydrocarbon. The feed rate was 30–35 cc. of hydrocarbon per minute per liter of reaction space, and the feed was mixed with sufficient of the circulating emulsion to give a molar ratio of isobutane to propylene at the point of introduction of the feed of approximately 100:1. A part of the circulating emulsion was continuously withdrawn to a separator after an average time of contact of hydrocarbon and acid in the reactor of about 20 minutes. After separation of the phases of the withdrawn emulsion the catalyst phase was continuously returned to the reactor until it had substantially lost its catalytic activity. The separated hydrocarbon phase was continuously withdrawn to an accumulator and then caustic treated and distilled for recovery of the alkylate which was carefully measured in both cases and then redistilled to separate the more valuable fraction boiling between 23° C. and 150° C. The reaction temperature was maintained at about 10° C. throughout the entire operation. The following results were obtained:

|  | Initial catalyst | |
| --- | --- | --- |
|  | 100% $H_2SO_4$ [1] | 99% $H_2SO_4$ 1% $CoSO_4.7H_2O$ |
| Volumes of product per volume of catalyst | 2.60 | 3.75 |
| Per cent of alkylate boiling 23° C.-150° C.: | | |
| 1st sample_____per cent__ | 87.6 | 91.2 |
| 2nd sample_____do____ | 79.3 | 88.5 |

[1] The spent acid contained only a trace of iron.

These results show that 1.15 more volumes of alkylate are obtained per volume of catalyst (an increase of 44.2%) by adding 1% of cobalt sulfate to a sulfuric acid alkylation catalyst and that the quality of the product is improved at the same time since the percentage of gasoline boiling hydrocarbons in the product is increased over that present at corresponding stages of the reaction in the absence of metals of the first transition series. Analogous improvements may be obtained by using other metals of the first transition series having atomic numbers of at least 24 but best results are produced with such metals having atomic numbers of at least 27. The improvements are most noticable at low isoparaffin to olefine ratios, thus making possible considerable savings in distillation expense since by the use of low feed ratios not only is the product obtained in a more concentrated form in the separated hydrocarbon phase but also the amount of distillation necessary for recovery of the excess isoparaffin is reduced.

It will thus be seen that the invention offers many advantages over prior methods of operation. Many variations and applications of the invention other than those mentioned by way of illustration may be used.

We claim as our invention:

1. A process of alkylating isobutane by reaction with propylene which comprises contacting isobutane with propylene in the presence of concentrated sulfuric acid containing cobalt sulfate.

2. A process of alkylating an isoparaffin by reaction with an olefine which comprises contacting said isoparaffin and olefine with concentrated sulfuric acid containing a sulfate of a metal of the first transition series in group VIII of the periodic table.

3. A process of alkylating an isoparaffin by reaction with an olefine which comprises contacting said isoparaffin and olefine with a sulfuric acid alkylation catalyst containing a salt of a metal of the first transition series in group VIII of the periodic table.

4. A process of alkylating an isoparaffin by reaction with an olefine which comprises contacting said isoparaffin and olefine with concentrated sulfuric acid containing at least 0.1% of a salt of a metal of the first transition series in group VIII of the periodic table.

5. A process of alklating an isoparaffin by reaction with an olefine which comprises contacting said isoparaffin and olefine with an inorganic acid alkylation catalyst containing at least 0.1% of a salt of a metal of the first transition series in group VIII of the periodic table.

6. A process of alkylating an isoparaffin by reaction with an alkylating agent which comprises contacting said isoparaffin and alkylating agent with an inorganic acid alkylation catalyst containing a salt of a metal of the first transition series in group VIII of the periodic table.

7. In a process of alkylating an aliphatic tertiary carbon atom-containing hydrocarbon by reaction with an alkylating agent in the presence of concentrated sulfuric acid, the improvement which comprises effecting said reaction in the presence of a metal of the first transition series in group VIII of the periodic table.

8. A process of alkylating an aliphatic tertiary carbon atom-containing compound by reaction with an alkylating agent which comprises contacting said aliphatic compound and alkylating agent with an inorganic acid alkylation catalyst containing at least 0.1% of a salt of a metal of the first transition series in group VIII of the periodic table.

9. A process of alkylating a tertiary aliphatic carbon atom-containing compound by reaction with an alkylating agent which comprises contacting said compound with said alkylating agent in the presence of an inorganic acid alkylation catalyst containing a salt of a metal of the first transition series in group VIII of the periodic table.

10. In a process of alkylating an organic compound in which a hydrogen atom can be substituted by an alkyl group by reaction with an alkylating agent, the improvement which comprises contacting said reactants in the presence of an inorganic acid alkylation catalyst containing a salt of a metal of the first transition series in group VIII of the periodic table.

SUMNER H. McALLISTER.
JOHN ANDERSON.
EDWIN F. BULLARD.